United States Patent [19]
Ron

[11] 3,751,919
[45] Aug. 14, 1973

[54] HYDRAULIC POWER BRAKE BOOSTER MOTOR

[75] Inventor: Benjamin Ron, Tel-Aviv, Israel

[73] Assignee: Samuel Shiber, Chicago, Ill.

[22] Filed: Oct. 15, 1970

[21] Appl. No.: 80,899

Related U.S. Application Data

[63] Continuation-in-part of Ser. No. 34,143, May 4, 1970, abandoned.

[52] U.S. Cl.............................. 60/54.5 P, 91/391
[51] Int. Cl.......................... F15b 7/00, F15b 13/10
[58] Field of Search.................... 60/54.5 P, 54.6 P; 91/391

[56] References Cited
UNITED STATES PATENTS

| | | | |
|---|---|---|---|
| 3,173,339 | 3/1965 | Larsen | 60/54.6 P |
| 2,848,877 | 8/1958 | Stetzer | 60/54.6 P |
| 3,119,235 | 1/1964 | Lewis et al. | 60/54.5 P |
| 3,327,760 | 6/1967 | Crawford | 137/599 |
| 3,032,992 | 5/1962 | Schnell | 60/54.6 P |
| 3,044,265 | 7/1962 | Schwartz et al. | 60/54.6 P |
| 3,050,944 | 8/1962 | Schwartz et al. | 60/54.6 P |
| 3,159,974 | 12/1964 | Rodgers | 60/54.5 E |

Primary Examiner—Martin P. Schwadron
Assistant Examiner—A. M. Zupcic
Attorney—Samuel Shiber

[57] ABSTRACT

A hydraulic booster motor adapted to be connected to and to activate a vehicle's master cylinder which is connected to a hydraulic braking system, the booster's valve body defines two coaxial bores, the large bore carries a power piston which is slidable in it and power-transmittingly connected to the primary piston of the master cylinder, and the small bore carries a reaction piston which is slidable in it and powertransmittingly connected through a linkage to the brake pedal of the vehicle, the booster valve body, together with the two pistons it carries, define a variable volume into which fluid flow is forced through an inlet port and which leaves the variable volume through an exhaust passage which is restricted when driver pushes the brake pedal with his foot.

12 Claims, 7 Drawing Figures

FIG.1

INVENTOR.
Benjamin Roll

Patented Aug. 14, 1973

HYDRAULIC POWER BRAKE BOOSTER MOTOR

HISTORY AND BACKGROUND

This application is a continuation in part of my copending application, Ser. No. 34,143, titled "Brake Booster Motor," Filed on May 4, 1970 now abandoned.

Activating the brakes of a moving vehicle requires work to be done. In large vehicles, such as trucks, the human foot cannot perform this work in the short duration acceptable by the present practice of braking, therefore a power brake is a must in these vehicles.

In passenger cars, until recently, a power brake was an optional item and a matter of convenience. With the switch to disc brakes on front wheels or all four wheels, the passenger cars moved into the same category as trucks with regards to braking; power brakes became more a necessity than a convenience option.

Also, the work capacity of the booster motor had to be increased to satisfy the work requirement of the disc brake mechanism, which is usually larger than the work required to activate a drum brake mechanism. This increase of the booster stressed the fact that the size of vacuum type booster motor presents a packaging problem to the car manufacturer under the already crowded hood of the passenger car.

Another problem with conventional power brakes, especially on a car equipped with disc brakes, was the fact that if the power booster motor became inoperable, the driver could not generate sufficient pressure in his brake line for a panic stop, by acceptable effort at brake pedal. This was mainly due to the fact that with conventional power brakes, often the travel of the pedal and driver's foot were decreased to approximately half the travel with manual brake for convenience reason, therefore, upon losing the power assist, the driver was called to roughly double the force he exerts on the brake pedal, compared with manual brake system.

To conclude, the present vacuum assist power brakes became large, expensive and with marginal performance when power was not available and the mechanical backup system had to be utilized.

SUMMARY

The preferred embodiment comprises a valve body defining two coaxial bores which contains a power piston powertransmittingly connected to a primary piston of a master cylinder, and a reaction piston powertransmittingly connected to a brake pedal.

The valve body and the two pistons it contains, sealing and slidable within their respective bores, define a variable volume into which the inlet port directs fluid flow, from some external flow source, and an exhaust passage through which the fluid leaves the variable volume.

In the "free position" the power piston is spaced from the reaction piston. As driver pushes the brake pedal, he causes the reaction piston to advance in its bore.

This movement of the reaction piston relative to the valve body restricts the flow leaving the variable volume through the exhaust passage, causing the pressure to rise inside the variable volume, and exert proportional forces on the power and reaction pistons according to their pressurized area. The power piston's force is transmitted to the primary piston of the master cylinder, where it causes pressure to be generated in the master cylinder and in the hydraulic brake system the master cylinder is connected to. The reaction piston's force is transmitted to driver's foot where it gives the driver a "feel" of the pressure generated in the brake system.

The mechanical linkage between the reaction piston and brake pedal, contains a spring. This spring can be preloaded, in which case the preload in the spring is designed to be overcome by a force applied on the brake pedal, slightly before this force is strong enough to initiate effective braking of the vehicle.

The second embodiment differs from the first one, primarily in the fact that the restriction of fluid flow leaving the variable volume is dependent on decreasing the gap between the power piston and the reaction piston. Therefore, the reaction piston has to "follow" the advancing power piston. This gives the driver "feel" in respect to the location of power piston in addition to the force "feel," however, the foot travel at pedal will be almost equal whether booster motor is operative or the brake is operated through the mechanical backup linkage.

The third embodiment is basically similar to the preferred embodiment, however, a second variable volume is defined by the power piston, power piston's bore and a cover through which a power piston extension connecting the power piston to master cylinder's primary piston extends.

The second variable volume is hydraulically connected to the variable volume exhaust passage, down stream relative to the restriction point. This addition of the second variable volume minimizes the effect of back pressure (ambient pressure) level at which the booster motor operates.

The fourth embodiment is similar to the second one in having its exhaust restriction of fluid exiting from the variable volume dependent on the relative distance gap between the reaction piston and the power piston, and similar to the third embodiment in having the second variable volume which is hydraulically connected to the exhaust port, beyond the restriction point to minimize the effect of the back pressure in the exhaust line on the forces transmitted by the brake booster motor to the master cylinder. This force is also minimized by minimizing the area of the power piston extension connecting master cylinder's primary piston to the power piston.

It is obvious that any of the embodiments can be connected to, and will activate either a single chamber or a tandem master cylinder.

It is recommended for economical reasons to attach the master cylinder directly to the brake booster motor, although they can be individually attached to a mutual base, such as, for example, car's frame, in any case it is recommended to have a space vented to atmosphere separating the two hydraulic units to assure that any leakage from one unit will not enter the other unit.

One of the objects of this invention is to provide a brake booster motor to actuate a master cylinder which is in hydraulic communication with the hydraulic actuators of a vehicular braking system, and which utilizes a forced fluid flow as a power source, from the same pump which serves the power steering system of the vehicle. Therefore, it is another object of this invention to provide a brake booster motor suitable to be hydraulically connected in series together with other hydraulic units such as the power steering motor of a vehicle, to a single pump, and which will operate independently, without being interfered with, or interfering with the operation of the other units, even when the various units operate simultaneously.

At this point, I would like to elaborate on the mutual relations between the power steering motor and the brake booster motor. The power steering motor I am referring to in this application is preferably an open center valve type, requiring continuous flow through it. Usually and basically, this type of power steering motor is not affected by the ambient pressure it operates in. For this type of power steering motor the preferred and second embodiments of my invention are most suitable, since they are slightly simpler than the third and fourth embodiments. However, if for some reason the power steering motor will be placed behind the brake booster motor, then the third or fourth embodiments are preferred, since they are practically not affected by the ambient pressure level they operate in, and since when they are operated, they do not interrupt the flow of fluid to the units connected to their exhaust line during the expansion of this variable volume. This is due to the fact that when the variable volume is filled by fluid entering through the inlet port, the second variable volume is discharging roughly the same volume into the exhaust port.

Another object of the invention is to provide a "feel" at the brake pedal which is related to the pressure the brake booster motor causes to be generated in the braking system's hydraulic lines.

Another object of the invention is to provide a mechanical backup linkage to allow manual operation of the brake system in case brake booster motor becomes inoperative.

A desirable feature of a brake system is a short travel of brake pedal when under normal conditions and additional travel at brake pedal in case brake booster motor becomes inoperative, so sufficient braking could be achieved by acceptable effort at the brake pedal, this aim is fully met by some species of this invention.

When car's engine stalls while driving, and if the car is equipped with manual transmission, usually, as long as the car remains in motion, the engine, and with it the power steering pump will keep rotating, being driven by the wheels. With an automatic transmission (even if the transmission is equipped with "front" servo pump only) usually the engine will be kept rotating by the wheels until the car slows down to, for example, 10–15 mph (obviously the above does not apply if the driver disengages the clutch or shifts the transmission out of gear).

Therefore, an important safety consideration evolves from the fact that the power steering and the brake booster motor are served by a common forced fluid flow source, since it will enable to back up both the power steering and the power brake with a single backup pressure source assuring forced fluid flow through both systems.

Obviously, such backup pressure source will be easier to justify, economically, when it serves these two vital systems of the car, simultaneously.

Other objects and features of the invention will become apparent from considerations of the following descriptions, which proceeds with reference to the accompanying drawings.

BRIEF DESCRIPTION OF DRAWING

Throughout the various FIGURES and embodiments, identical parts will be identified by same numeral.

DETAILED DESCRIPTION OF PREFERRED EMBODIMENT

Figure 1:
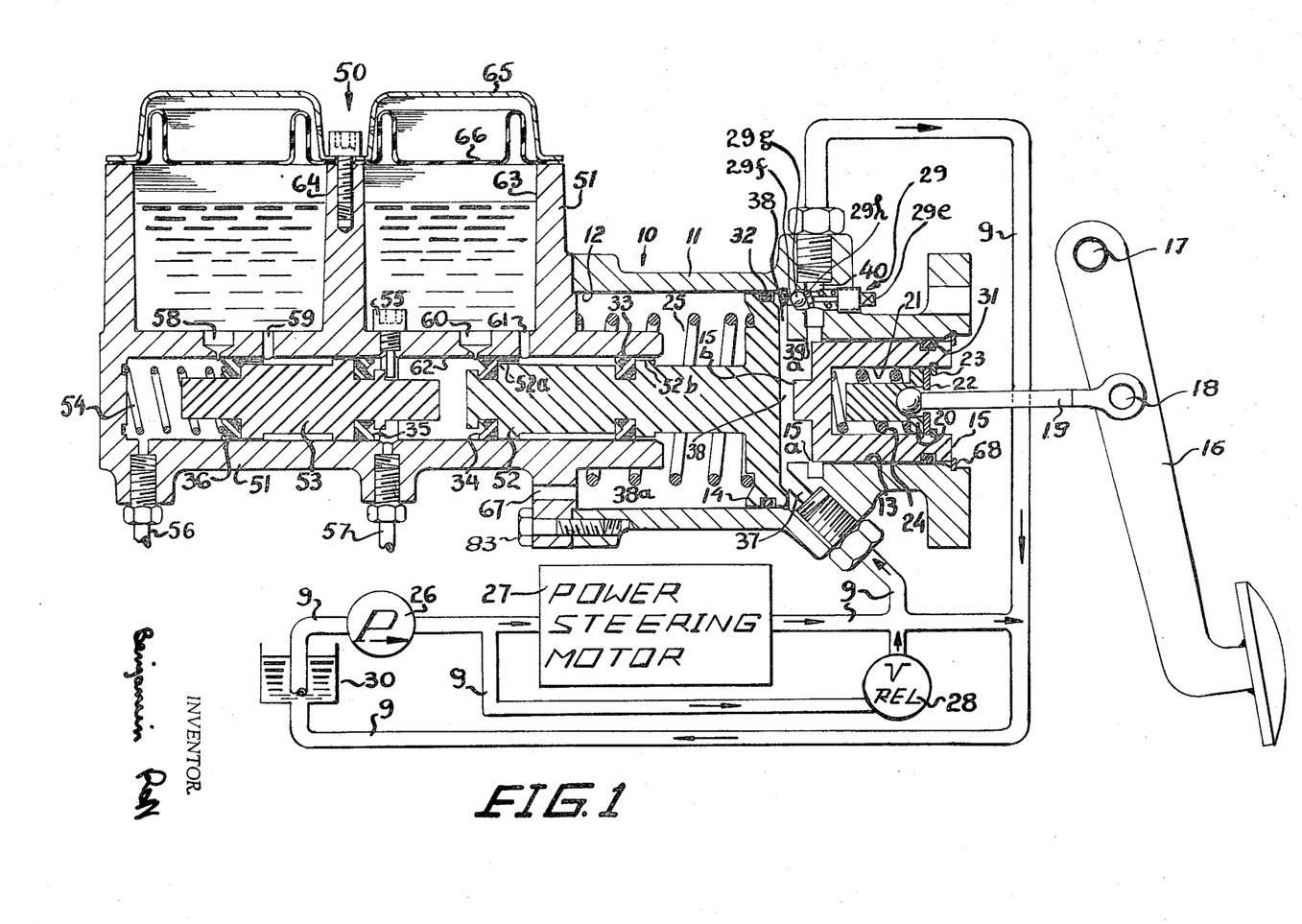
FIG. 1 shows a sectional view of the preferred embodiment attached to a tandem master cylinder.

As shown in FIG. 1, a brake booster motor 10 is shown, including a valve body 11. The valve body defines a first bore 12 and a second bore 13 coaxial with one another.

A power piston 14 slidably disposed within the bore 12 and sealing it.

A reaction piston 15 slidably disposed within the bore 13 and sealing it.

A power transmitting linkage between the reaction piston 15 and a brake pedal 16 comprising a push rod 19, a seat 20 and a preloaded compression spring 24.

The pedal 16 is pivotally mounted on a fixed pin 17, and carries a pin 18 to which the push rod 19 is connected.

A washer 22 avoids the push rod 19 from exiting out from the seat 20, and the seat 20 from dropping out of a bore 21.

A snap ring 23 is securing the washer 22 in place. The compression spring 24 is disposed in the bore 21, seated against the reaction piston 15 at one end and against the seat 20 at its other end. A snap ring 68 limits the piston 15 from exiting the bore 12.

A preloaded high rate compression return spring 25 is seated against the power piston 14 at one end and against a housing 51 of a master cylinder 50 at its other end which serves as a fixed support for said spring.

A pump 26 is forcing fluid flow first through a power steering motor 27 and then through the brake booster motor 10. A power steering relief valve 28 hydraulically connected in parallel to the power steering motor limits the maximum hydraulic pressure drop across the power steering motor, and a brake booster relief valve 29 hydraulically connected in parallel to the brake booster motor is limiting the maximum pressure drop across the brake booster motor.

The relief valve 29 comprises a passage 29f, a ball 29g, a spring 29h and a plug 29e. In the preferred embodiment the relief valve 29 is shown integrated in the design of the brake booster motor, although the designer is free in this embodiment and in the other embodiments to either integrate the relief valve 29 in the brake booster design or to connect it externally.

Numeral 9 indicates a hydraulic line in various places.

Numeral 30 indicates a fluid reservoir.

Numerals 31, 32, 33, 34, 35 and 36 indicate seals.

An inlet port 37 is in communication with a variable volume 38 which is in restrictable communication with a groove 39 which is in turn in communication with a passage 40. The groove 39 together with the passage 40 constitute an exhaust passage.

The master cylinder 50 is generally a conventional tandem master cylinder with several modifications. A primary piston 52 is, for economical reasons, made in one piece with the power piston 14, therefore a return spring for the primary piston is not required. A bearing shoulder 52b is backing the low pressure "wiper" seal 33, and can be made smaller than a shoulder 52a which backs the high pressure seal 34. This will allow some eccentricity between the bore 12 and a bore 62 without binding of the primary piston and the power piston.

A floating piston 53 is urged by a return spring 54 to the right against a stop bolt 55.

A hydraulic brake line 56 leads to the front wheels' brake actuators (not shown) of a car, and a line 57 leads to the rear brake actuators (not shown).

Ports 58 and 59 communicate a reservoir 64 defined by the housing 50 to the bore 62 defined by the housing 51, and ports 60 and 61 communicate a reservoir 63 defined by the housing 51 to the bore 62. Numeral 65 indicates a master cylinder cover and numeral 66 indicates a seal.

A passage 67 vents a second variable volume 38a to atmosphere.

OPERATION OF PREFERRED EMBODIMENT

The pump 26 forces fluid flow through the power steering motor 27 when then enters the variable volume 38 through the inlet port 37, and exits the variable volume through the exhaust passage.

When no pressure is applied by driver to the brake pedal 16, the brake booster motor is in the "free position," that is the primary piston, the power piston and the reaction piston are in retracted position, as shown in FIG. 1.

As driver presses on the brake pedal the reaction piston 15 advances leftwards closing a restriction point between a groove's lip 39a to a piston's edge 15a restricting the fluid flow, from the variable volume 38 into the groove 39. This in turn raises the pressure in the variable volume 38 and causes the power piston 14 and the master cylinder primary piston 52 to advance leftwards, applying the car's brake system to which the master cylinder 50 is hydraulically connected.

As long as the power piston 14 is advancing, part of the fluid flow entering the inlet port 37 is filling the expanding variable volume 38, however, as the power piston stops and if the pressure in the variable volume 38 at this stage is not high enough to open the relief valve 29, again the total flow has to find its way through the restriction point between the groove's lip 39a and the piston's edge 15a, and this moves the reaction piston 15 slightly backwards, or "rebounces" the reaction piston. By its design the restricting point between the groove's lip 39a and the piston's edge 15a is causing the restriction of flow out of the variable volume to be abrupt relative to the advancement of the piston 15, and within a fraction of an inch to change from unrestricted, to fully restricted; this is important to minimize the size of the rebound, as it will be later illustrated in the design example.

The advancement of the reaction piston 15 leftwards, toward the power piston is caused, as mentioned before by driver pushing the pedal which pushes the push rod 19, which in turn pushes the reaction piston 15, through the spring 24. The spring 24 can be preloaded, and if it is preloaded the preload should be designed to be overcome slightly before the drastic slow down of the primary and the power pistons occurs, so when it occurs the spring 24 is already active, and when the slight rebound of the reaction piston 15 occurs, through the spring 24, it becomes insignificant.

As the driver increases his force on the brake pedal 16, at some point beyond this stage of "engaging" of the friction elements of the brake system the seat 20 bottoms on the reaction piston 15 and establishes mechanical abutting connection with it, and the spring 24 becomes inactive again. The reason for the careful design of the active range of the spring 24 is to avoid unnecessary loss of brake pedal travel in case the mechanical backup linkage is utilized.

This point will be further discussed in the following paragraph.

If for some reason the booster motor becomes inoperative, for example, due to stoppage in the fluid delivery at the inlet port 37, or failure of the seal 32, the system automatically switches to a second pedal ratio. In such a case the reaction piston 15 continues to advance toward the power piston 14 until it establishes mechanical connection with the power piston 14 by bringing a piston's nose 15b into abutting relationship with the power piston 14. From this point on, the driver can activate the master cylinder 50 mechanically "through" the booster.

At this point, another design consideration of the spring 24 can be realized. As driver increases his force the spring 24 will start to contract and before a severe braking can be established, it will be at least partly contracted from its "free position." As far as this unassisted "mechanical" mode of operation of the master cylinder is concerned, this is a "lost travel" that should be minimized. Another "lost travel" is contributed by the gap between the reaction piston's nose 15b and the power piston 14. This gap can be made smaller than the movement of the piston 15, from its "free position," to fully restrict the flow entering the groove 39, therefore it can be made very small, i.e. a small fraction of an inch, however, it is important to make this gap large enough so that "normally," i.e. during normal operation when brake booster motor is operative the reaction piston would not establish mechanical powertransmitting contact with the power piston, since this will give the driver an erratic feel at brake pedal.

The pump 26 is selected so it can supply required flow at a pressure equal to the sum of maximum pressure drops across the power steering motor 27 and the brake booster motor 10. The maximum pressure drop across the power steering motor 27 correspond to the relief pressure of the valve 28 and the maximum pressure drop across the booster motor 10 correspond to the relief pressure of the valve 29.

The relief valve 29 will open when the pressure in the variable volume 38 exceeds the pressure in the passage 40 by a certain predetermined amount.

The two relief valves assure the independent operation of the power steering motor 27 and the booster motor 10.

Generally if the booster motor is hydraulically connected in series, together with other units to a single pump, preferably it should be the last unit (the most remote from the pump and closest to reservoir) down stream because it is sensitive to back pressure and pressure fluctuations occurring down stream (between itself and the reservoir). However, if for some reason it is necessary to put a hydraulic unit between booster motor and reservoir, and the unit works at a substantially steady low pressure drop across itself, the spring 25 can be preloaded to a degree that will avoid this pressure from moving the power piston 14 from its "free position." The spring 25 has an additional function, to smooth the transition of the system from the "prebraking-stage" to the "braking stage." It is characteristic of most vehicular brake systems to consume relatively large volume of fluid showing a small increase in brake line pressure in the prebraking stage, i.e. while the brake's friction elements are being brought into engagement with their mating friction surfaces. In the braking stage a relatively small additional volume forced into the brake lines, 56 and 57, will raise the pressure in the brake system substantially. As the brake system enters this stage, the primary piston 52 and the power piston 14 slow down as mentioned earlier. The spring 25, has a high rate, which causes the pressure in the variable volume 38 to increase as the system advances through the prebraking stage and thus it smooths the transition from the prebraking to the braking stage.

At this point, I would like to convey some of my experience regarding the above subject.

The above mentioned transition has been felt more drastically with a car equipped with drum brakes than in a car equipped with disc brakes on front wheels.

With a car equipped with drum brakes on all four wheels good results and smooth transition has been achieved with the spring 25 weighing 100 – 160 pounds after the power piston has been displaced approximately half way from its "free position" to the end of its available travel. In a car equipped with disc brake mechanism on the front wheels and drum brake mechanism on the rear wheels the weight of the spring 25 was reduced to 40 pounds with no adverse feeling at the brake pedal. In all these tests the diameter of master cylinder's primary piston was 1 inch. If the area of the primary piston is changed, these values should be changed proportionally.

There are some practical considerations valuable to the designer of a system according to the preferred embodiment of my invention that I will try to teach by using a numerical example, in which I chose the numbers arbitrarily and in which volumetric and mechanical losses are neglected.

DESIGN EXAMPLE — PREFERRED EMBODIMENT

A car's brake system normally requires a maximum brake line pressure of 1,200 psi when the booster motor is operative, and 450 psi when the brake booster is inoperative at 150 pounds maximum effort at the brake pedal. The master cylinder's primary piston 52 has an area of one square inch and a stroke of 1 inch. When the system provides the required 1,200 psi brake line pressure, the spring 25 weighs 150 pounds, therefore a total maximum force of 1,350 pounds should be supplied by the power piston 14.

The normal maximum pressure drop across the power steering motor 27 of the car is 1,000 psi and assuming that it has been established that it is possible to raise the pressure output from the pump 26 by 150 psi without redesign of the pump 26, 150 psi are made available for the brake booster motor. To generate the 1,350 pounds from a pressure of 150 psi the area of the power piston will be 9 square inches.

Although the discussion here is purely to serve the design example, I would like to comment that the requirement for maximum pressure at both the booster motor 10 and the power steering motor 27 simultaneously is a rare occasion, and the pump won't have to be designed to operate for any considerable length of time under this condition. On the other hand, again from practical consideration, it is important to have the power piston 14 with area substantially larger than the area of the primary piston 52, since if both pistons had the same area the added pressure requirement on the pump 26 would amount to 1,350 psi and the pump would have to be designed to supply a total of 2,350 psi which would probably call for a complete redesign and upgrading of the pump, pump drive means and hydraulic hoses to take care of the enlarged pressure.

The gap between the groove's lip 39a and the piston's edge 15a, which is the restriction point, is 0.035 inch, i.e. to fully restrict the exhaust passage, the reaction piston has to advance 0.035 inch from its "free position." (By "free position" it is meant the position of the various components of the brake booster motor when no force is applied on brake pedal). To bring the brake system to frictionally engage the brakes, the movement of the reaction piston is only 0.030 inch and the "rebounce" mentioned before is 0.005 inch. In parallel, the spring 24 preload, at the point of engagement, has been overcome and the total deflection of the spring from its free length is one-half inch. The rebounce of the reaction piston 15, totalling 0.005 will cause the load on the spring to increase approximately 1 percent. When this will be translated by the booster motor 10, the booster motor will increase the brake lines' 56 and 57 pressure in proportion.

Since the rebounce phenomena occurs at approximately 310 psi brake line pressure, and at this position I will assume the return spring 25 weighs 90 pounds, the pressure increase will be approximately 4 psi, as will be later shown, the effort at brake pedal will be at this pressure level 21.3 pounds and the increase here due to the rebounce should amount to approximately 0.21 pounds.

To conclude this point, the fact that the spring 24 is active during the transition of the system from prebraking to the braking stage combined with the smoothening of the brake system characteristics by the spring 25, as explained before, reduce the rebounce phenomena to a hardly detectable size.

Assuming that the seat 20 is allowed 0.100 inch travel before it bottoms in the end of the blind bore 21, and that the gap between the reaction piston nose 15b and the power piston 14 is 0.025 inch, maximum total travel of the push rod 19 could amount to 1.125 inch.

To create 450 psi mechanically with the booster inoperative and to overcome the spring 25 that at this pressure level of 450 psi, is assumed to weigh 100 pounds, takes a force of 550 pounds at the push rod 19. Since 150 pounds are available at the pad of the brake pedal 16, the pedal travel ratio (which is the ratio of foot travel at the brake pedal 16 divided by the push rod 19 travel) will have to be 3.67:1. The maximum pedal travel will be 4.7 inches in case of power failure and roughly 0.500 inch when the brake booster motor is operative.

At this point I would like to mention that the travel at brake pedal, when brake booster is operative, will be independent from such factors as the brake adjustment or brake fading, which in most cars causes the travel at brake pedal to vary.

If we choose reaction piston's area to be 1.75 inch square, the pedal effort at 1,200 psi brake line pressure will be roughly 72 pounds when brake booster motor is operative.

At this stage of the discussion I would like to convey some experience gained from several prototypes tested:

The power piston diameter is preferably larger than the primary piston's diameter since the pressures required in the brake system are usually higher than the pressure that can be supplied, economically, to the variable volume, without penalizing the pump design, especially if the same pump serves the power steering as well, as previously mentioned, however, by enlarging the area of the power piston we increase the response time of the brake booster motor, as well as increasing its physical size. Therefore, preferably the range of diameter's ratio is a power piston with a diameter 1.2 times to 5 times larger than the diameter of the primary piston.

A second point of importance is the abrupt restriction of the exhaust passage. As explained previously, the reason for the abruptness is to minimize the rebounce of the reaction piston, and that is why the restriction of exhaust passage in the preferred embodiment is done between the groove's lip 39a and the piston's edge 15a.

In this configuration, the opening between the groove's lip and the piston's edge has a configuration, if layed flat, of a rectangular, in which the base is the periphery of the bore 13 and the height is the distance between the groove's lip and the piston's edge. Since the periphery of the bore 13 is relatively a very large dimension (compared to dimensions of other possible restrictable openings such as, for example, the diameter of a radial hole opening in the wall of bore 13) the required distance between groove's lip and piston's edge can be minimized. According to my experience, the restriction should be substantially completed before reaction piston traveled from its "free position" one-eighth of its full available travel, and preferably within a shorter part of the full travel.

DETAILED DESCRIPTION OF SECOND EMBODIMENT

Figure 2:
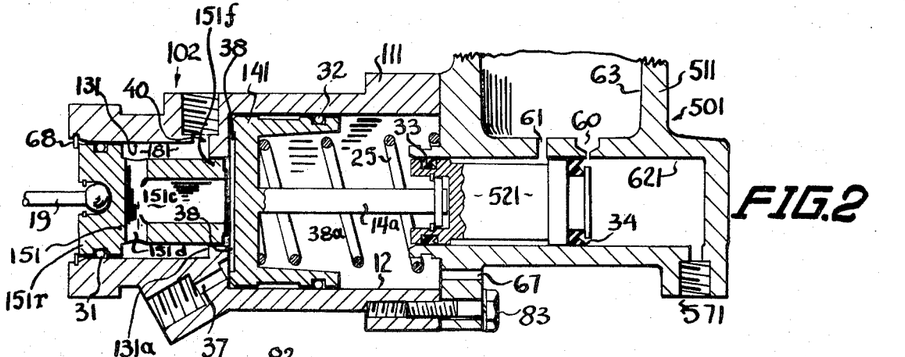
FIG. 2 shows a sectional view of the second embodiment attached to a master cylinder.

As shown in FIG. 2, a master cylinder 501 has a housing 511 defining a reservoir 63, a bore 621, and passages between the reservoir and the bore, 60 and 61. The housing 511 is attached to a valve body 111 of a brake booster motor 102 by bolts 83 (one shown). The valve body 111 defines a first bore 12 coaxial with a second bore 131. The bore 12 contains a power piston 141 which is powertransmittingly connected by a power piston extension 14a to a primary piston 521 of the master cylinder 501. The primary piston is disposed in the bore 621. The bore 131 contains a reaction piston 151. The reaction piston, the power piston and the primary piston are slidable and sealing in their respective bores. The reaction piston 151 has a rear section 151r to which a push rod 19 is powertransmittingly connected and a front section of smaller diameter 151f which passes through a closely fitting step 131a. The close fit between the step 131a and the reaction piston allows a minimum fluid leakage through it.

A variable volume 38 is defined by the valve body 111, the reaction piston 151 and the power piston 141, and a secondary variable volume 38a is defined by the bore 12, the power piston 141 and the master cylinder 501. The secondary variable volume is vented to atmosphere by a passage 67. A fluid passage is defined by the valve body 111, the power piston 141 and the reaction piston 151, comprising an inlet port 37, the variable volume 38, a variable gap between the reaction piston and the power piston, this gap is the restriction point for the flow exiting the variable volume 38, a passage 151c and a passage 151d defined both by the reaction piston 151, an annular passage 181, defined between the valve body 111 and the reaction piston 151 and the bore step 131a, leading to a passage 40 which is in communication with an exhaust line (not shown).

A return spring 25 is disposed between the power piston 141 and the housing 511. A seal 31 is disposed between the reaction piston 151 and the bore 131. A seal 32 is disposed between the power piston 141 and the bore 12. Seals 33 and 34 are disposed between the primary piston 521 and the bore 621.

A snap ring 68 serves as a stop for the reaction piston 151.

A master cylinder discharge port 571 is suitable to be connected to a hydraulic brake system.

OPERATION OF SECOND EMBODIMENT

Forced fluid flow enters the brake booster motor 102 through the inlet port 37, then passes through the variable volume 38, through the gap between the power piston 141 and the reaction piston 151, through the passages 151c and 151d defined by the reaction piston 151, through the annular passage 181 to the passage 40.

As driver presses the brake pedal, the push rod 19 pushes the reaction piston 151 toward the power piston 141 closing the gap between the two pistons, which restricts said fluid flow at the restriction point, raising the pressure in the variable volume 38 forcing the power piston 141 to push the primary piston 521 in its bore 621.

As the power piston 141 advances, the reaction piston has to follow it in order to keep the gap between the two pistons restricted.

Obviously, spring means can be included in the linkage between the brake pedal and the reaction piston for similar purposes shown in the preferred embodiment.

DETAILED DESCRIPTION OF THIRD EMBODIMENT

Figure 3:
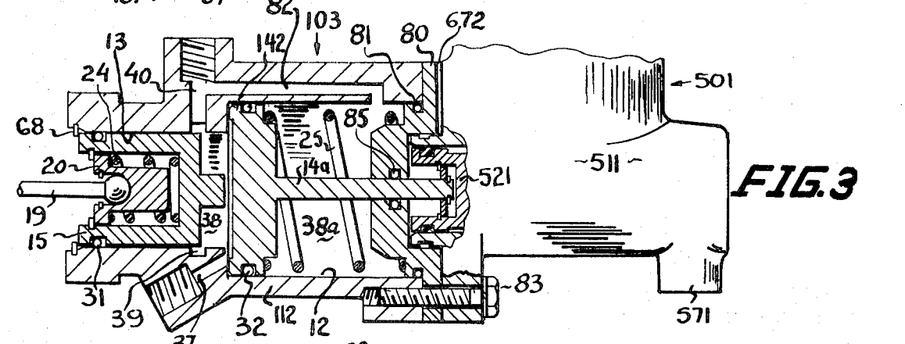
FIG. 3 shows a sectional view of the third embodiment attached to a master cylinder.

As shown in FIG. 3, a master cylinder 501 having a housing 511 which carries a primary piston 521 and a discharge port 571, is connected by bolts 83 (one shown) to a brake booster motor 103 having a valve body 112. The valve body 112 defines a second bore 13 which carries a reaction piston 15 which is connected to a push rod 19 through a spring 24 and a seat 20. The spring 24 can be preloaded. The valve body 112 defines a first bore 12 which carries a power piston 142 having an extension 14a powertransmittingly connecting the power piston to the primary piston 521, passing through a rear cover 80. A fluid passage is defined between an inlet port 37 and a passage 40 through a variable volume 38 and a groove 39. A fluid passage 82 defined by the valve body 111 connects the passage 40 to a secondary variable volume 38a defined by the first bore 12, by the power piston 142 and by the rear cover 80. A seal 31 is disposed between the reaction piston 15 and the bore 13. A seal 32 is disposed between the power piston 142 and the bore 12. A seal 85 is disposed between the power piston's extension 14a and the rear cover 80. A seal 81 is disposed between the rear cover 80 and the bore 12. A return spring 25 is disposed between the power piston 142 and the rear cover 80. Numeral 68 indicates a snap ring, and numeral 672 indicates a vent passage.

OPERATION OF THIRD EMBODIMENT

The third embodiment operates basically in a similar manner to the preferred embodiment, with one distinct difference, that is, the secondary volume 38a is sealed from the atmosphere and connected hydraulically by the passage 82 to the passage 40. The passage 82 can be designed to be slightly restrictive to dampen the advancement of the power piston. This causes the pressure maintained in the exhaust line and the passage 40 to act on both faces of the power piston 142. Since the power piston extension 14a is extending through the rear cover 80, its area is not balanced so the end result is that the pressure maintained in the passage 40, is effective only on the extension 14a cross section area, and this area is kept to a minimum allowable from practical considerations. Due to preload on the return spring 25, this resultant force is not high enough to cause the power piston 142 to start moving.

As driver applies the brake pedal, pushing the reaction piston 15 in its bore, the variable volume 38 becomes pressurized by the pressure drop across the restriction point caused by narrowing the passage between the groove 39 and the variable volume 38, and this pressure is added to the prevailing pressure in the variable volume 38, but this pressure drop across the restriction point does not affect the pressure prevailing at the secondary variable volume 38a which remains equal to the pressure prevailing at the passage 40.

This embodiment, therefore, can be connected together with a power steering motor or other hydraulic units, in series, to a single pump in any order. In the preferred embodiment a large fluctuating ambient pressure at the exhaust line would disturb the operation of the preferred embodiment.

DETAILED DESCRIPTION OF FOURTH EMBODIMENT

Figure 4:
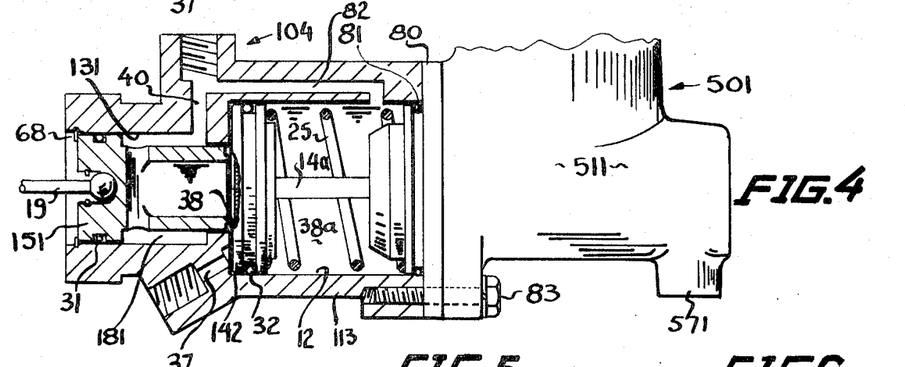
FIG. 4 shows a sectional view of the fourth embodiment attached to a master cylinder.

As shown in FIG. 4, a master cylinder 501 having a housing 511 is connected by bolts 83 (one shown) to a valve body 113 of a brake booster motor 104. The valve body 113 defines a second bore 131 containing a reaction piston 151 in which a push rod 19 is seated. The valve body 113 also defines a first bore 12 containing a power piston 142 which is powertransmittingly connected to a primary piston of master cylinder by a power piston extension 14a which passes through a rear cover 80. A return spring 25 is disposed between the power piston 142 and the rear cover 80. The rear cover 80 and the power piston together with the bore 12 defines a second variable volume 38a which is hydraulically connected by a passage 82 to an exhaust port 40 which is hydraulically connected to an annular passage 181. An inlet port 37 is hydraulically connected to a variable volume 38. A snap ring 68 serves as a return stop for the reaction piston 151.

A seal is disposed between the reaction piston 151 and the bore 131. A seal 32 is disposed between the bore 12 and the power piston 142, and a seal 81 is disposed between the rear cover 80 and the bore 12.

A master cylinder's discharge port is indicated by numeral 571.

OPERATION OF THE FOURTH EMBODIMENT

In the fourth embodiment the reaction piston 151 is similar to the reaction piston of the second embodiment, and the restriction of the exhaust of fluid flow leaving the variable volume 38 is done in similar manner in the second and fourth embodiments.

In the fourth embodiment the secondary variable volume 38a is sealed from the atmosphere and is connected to the passage 40, similar to the third embodiment.

Figure 5:
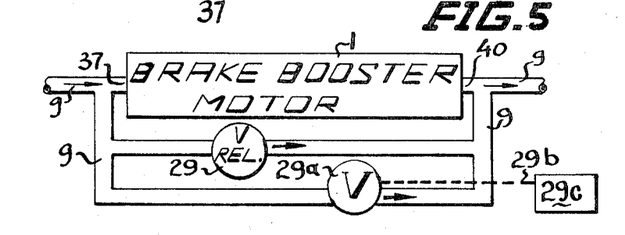
FIG. 5 shows a block diagram of a brake booster motor which is relieved by an externally controlled valve.

DETAILED DESCRIPTION OF FIG. 5

A brake booster motor, according to preferred, second, third or fourth embodiment is shown indicated by numeral 1.

A relief valve is indicated by numeral 29. This relief valve can be integrated in the brake booster motor design or it can be an external unit. An externally controlled valve is indicated by numeral 29a. The three units 1, 29 and 29a are hydraulically connected in parallel to each other.

The valve 29a can be a variable throttle valve or a variable pressure relief valve, controlled through a control line 29b by a control unit 29c. The control unit can be, for example, an "anti skid" control, however, the construction of this unit is not included in the scope of this invention. The purpose of valve 29a is to allow external inputs to regulate the pressure drop across the brake booster motor. This regulation will vary the discharge pressure from the master cylinder that the brake booster is connected to, however, the driver could overrule this regulation, if he so desires, through the mechanical backup linkage, that is, if he applies enough force to cause the reaction piston to abut on the power piston, he can push the power piston mechanically.

DETAILED DESCRIPTION OF FIFTH EMBODIMENT

Figure 6:
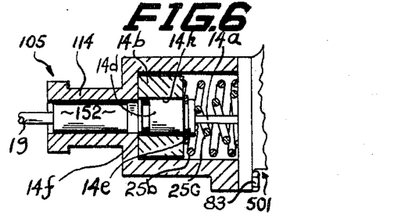
FIG. 6 shows a sectional view of a brake booster motor with a modified power piston.

As shown in FIG. 6 the fifth embodiment shows a modified power piston which can be utilized in the preferred, second, third or fourth embodiment.

Numeral 105 indicates generally a brake booster motor comprising a valve body 114, a reaction piston 152, a power piston comprising an outer sleeve 14b defining a central bore 14h in which an inner piston 14d is disposed slidably, sealing it with a seal 14f. A powertransmitting stop, 14e is seated in a groove formed in the inner piston 14d.

A master cylinder 501 is connected to the valve body 114, a return compression spring 25b disposed between the master cylinder and the outer sleeve and a return compression spring 25c disposed between the master cylinder 501 and the inner piston.

OPERATION OF FIFTH EMBODIMENT

The improvement shown in the fifth embodiment becomes operative when a power failure occurs, and the brake booster becomes inoperative.

In such a case, as previously described, the reaction piston 152 will establish a mechanical abutting connection with the power piston and push the power piston and the primary piston of the master cylinder actuating the brake system.

In the previous embodiments a return spring 25 had to be overcome, where in this embodiment a spring 25c has to be overcome but spring 25b remains in its "free position," and since spring 25c can be substantially smaller than spring 25 the effort for actuating the brake system through the mechanical backup linkage can be reduced.

Figure 7:
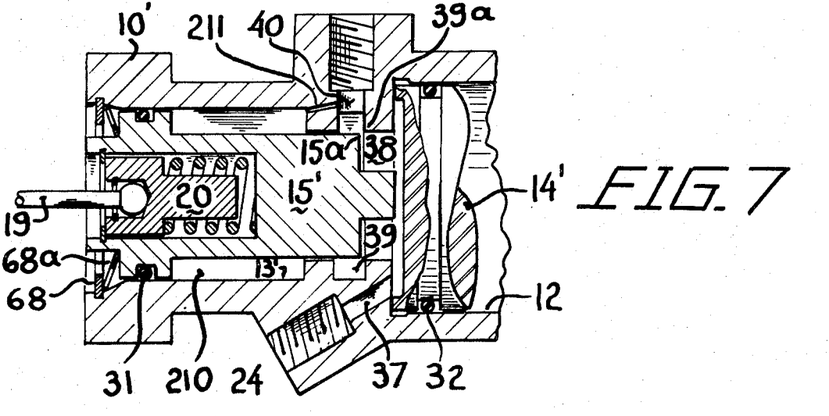
FIG. 7 shows a sectional view of a modified reaction piston.

MODIFICATION OF PREFERRED AND THIRD EMBODIMENTS:

The preferred and third embodiments shown in FIGS. 1 and 3 respectively can be further modified to include a means to dampen the movement of the reaction piston in its bore 13, and to automatically adjust the restriction point, as shown in FIG. 7, for the purpose of smoothening the reaction at the brake pedal 16 when it is abruptly depressed by the driver.

Without such dampening means the pedal may over travel into the variable volume 38, and when the pressure will be built in the variable volume 38 an instant later, the reaction piston will be urged backwards unless the driver maintains sufficient force at pedal.

With dampening means the above mentioned "overshoot" of the reaction piston and subsequent "rebounce" will be minimized. The response time of the system during normal operation will be practically unaffected by such a damper, as shown in FIG. 7, since the movement of the reaction piston in its bore 13 is very small during normal operation, as explained before, however, the designer should avoid excessive dampening since the reaction piston will have to travel together with the master cylinder's primary piston when the mechanical backup linkage is utilized.

The second modification shown in FIG. 7 is an automatic adjustment of the restriction point to maintain a substantially constant residual pressure at the variable volume 38, when the unit is in "free position," regardless of changes in the viscosity of the oil flow entering port 37.

This modification is independent of the dampening means modification shown in FIG. 7, however, when such dampening means are utilized, the automatic adjustment of the restriction point becomes more desirable for reasons that will be explained later.

The residual pressure in the variable volume 38 consists of the pressure drop across the fully open (unrestricting) restriction point, i.e. the pressure drop across the gap between piston's edge 15a and groove's lip 39a when the unit is in "free position," plus the back pressure down stream relative to the brake booster motor; ordinarily this will be the pressure drop along the return line from the brake booster motor to the reservoir 30.

DETAILED DESCRIPTION OF FIG. 7

FIG. 7 teaches how to modify the reaction piston and the surrounding valve body section of either the preferred or third embodiments in order to include a dampening means and an automatic restriction point adjusting means in these assemblies.

A reaction piston 15' is connected to push rod 19 via a seat 20 and a spring 24, and it is slideable within a stepped bore 13', with which it defines an annular damper chamber 210 which is connected by an orifice 211 to a passage 40.

When this damper is incorporated in the preferred embodiment the power piston 14' will be designed similar to the power piston 14 shown in FIG. 1 and when the damper is incorporated in the third embodiment it will be designed similar to power piston 142 shown in FIG. 3.

The orifice 211 can be a simple passage or can be designed as a more elaborate orifice which is not drastically affected by temperature and viscosity changes of the oil.

Finger spring washer 68a urges the reaction piston 15' toward the power piston, reducing the gap between the piston's edge 15a and groove's lip 39a.

OPERATION OF THE MODIFICATIONS SHOWN IN FIG. 7

As push rod 19 is abruptly pushed, oil from the annular damper chamber 210 has to be forced through orifice 211 in order for the reaction piston 15' to advance, which slows this advancement allowing time for pressure to be built up in the variable volume 38, and minimizing the over travel of a piston's edge 15a across a groove's lip 39a, thus minimizing the "rebounce" which takes place as the pressures in the unit stabilize.

To illustrate the operation of the automatic adjustment of the restriction point, it will be assumed that the normal residual pressure in the variable volume 38 is 15 psi. This pressure drop consists of 5 psi pressure drop along the return line from the brake booster motor to the reservoir 30, and 10 psi pressure drop across the open restriction point. The corresponding gap between piston's edge 15a and groove's lip 39a while these conditions prevail is 0.035 inch. (If an additional hydraulic unit is placed down stream relative to the power brake booster motor the residual pressure may be much higher, and accordingly the force that the finger spring washer 68a exerts on the reaction piston should be increased).

If the oil flow entering inlet port 37 becomes hotter than normal, the pressure drop along the return line drops from 5 psi to 2 psi, and the gap of 0.035 inch would cause only a 4 psi pressure drop across itself instead of 10 psi, thus the residual pressure would be 6 psi only, however, due to finger spring washer 68a, under these conditions the reaction piston 15' will be advanced in its bore closing the gap and maintaining the pressure at a level close to 15 psi (although somewhat below 15 psi).

When the oil flow entering through inlet port 37 is colder than normal, an opposite correction will occur, i.e., the gap between piston's edge 15a and groove's lip will be enlarged beyond its normal dimension of 0.035 inch, again maintaining the residual pressure level close to 15 psi.

The accuracy of these corrections will depend mainly on the low spring rate of finger spring washer 68a.

It is worth noting that the preloaded compression spring 25, prevents the power piston from advancing in its bore due to the residual pressure alone.

As mentioned previously, the two modifications shown in FIG. 7 are independent from one another, however, when dampening means for slowing the advancement of the reaction piston are utilized the automatic adjustment of the restriction point is more desirable for the following reason:

Without automatic adjustment, the gap between piston's edge 15a and groove's lip 39a has to be large enough not to cause excessive residual pressure even when the oil flow entering the variable volume 38 is very cold, therefore, when the oil is hot, the gap will be excessive, and due to the dampening means, the closing of the gap when brake pedal is depressed, will be slowed down, causing a time delay in the actuation of the brake system.

Another feature of the automatic adjustment of the restriction point is that it cancels most of the reaction at the brake pedal due to the residual pressure, in the variable volume 38. This feature is especially important when the residual pressure is substantial due to a hydraulic unit down stream relative to the brake booster motor.

After describing the two optional features, I would like to mention that according to my experience a smooth operating unit can be achieved without either feature, especially for industrial applications, however, for passenger cars these additional features may prove of value.

Throughout the application the brake booster motor has been shown connected to, and activating, a hydraulic master cylinder, since a master cylinder and hydraulic lines are the most commonly used powertransmitting means to connect the vehicle's brake pedal to the brakes' friction elements. However, it should be obvious that the brake booster motor can activate the brakes' friction elements through mechanical means in vehicles that such mechanical powertransmitting means are used.

The present invention has been demonstrated in conjunction with a limited number of embodiments. It will be appreciated that this is only illustrative of the invention, and not restrictive. Modifications and substitutions can be made in the design of a brake booster motor according to my invention without departing from the spirit of the invention, and it is my intention to include such designs in the scope of my invention.

I claim:

1. A brake booster for activating a vehicle's master cylinder, comprising, a valve body which defines a first bore connected with a second bore, a power piston slideable in said first bore and being power-transmittingly connected to a primary piston of said master cylinder, a reaction piston slideable in said second bore being power-transmittingly connected to a brake pedal of said vehicle, said power and reaction pistons being spaced one from another when said booster is in its free position and adapted to establish a mechanical power-transmitting connection after a relative travel between the pistons, said valve body defining an inlet port communicating with a variable volume which is also defined by said valve body and in between said power and reaction pistons, a restriction point defined in between said valve body and said reaction piston adapted to abruptly restrict flow through itself in response to a relative travel of the reaction piston relative to the valve body, and a flow passage through said brake booster motor initiating at said inlet port, continuing through said variable volume and through said restriction point.

2. A brake booster motor as in claim 1 including spring means disposed in a power-transmitting linkage connecting said reaction piston to said brake pedal, making said linkage resilient while said spring means is active, and abutting stop means making said spring means inactive when a certain level of force transmitted through said linkage is surpassed.

3. A brake booster motor as in claim 1 including a spring means urging said reaction piston in a direction toward said power piston to maintain a substantially constant pressure in said variable volume when said brake booster motor is in its free position.

4. A brake booster motor as in claim 1, including a secondary variable volume defined by said valve body and in between said power piston and a cover at the end of said first bore, said secondary variable volume being in communication with said flow passage downstream of the restriction point.

5. A brake booster motor as in claim 1, including a dampening means to dampen the movement of said reaction piston relative to said valve body.

6. A brake booster motor as in claim 5, wherein said dampening means comprises an annular damper chamber defined in between said valve body and said reaction piston and orifice means communicating said damper chamber to said flow passage.

7. A brake booster for activating a vehicle's master cylinder, comprising, a valve body which defines a first bore connected with a second bore, a power piston slideable in said first bore and being power-transmittingly connected to a primary piston of said master cylinder, a reaction piston slideable in said second bore being power-transmittingly connected to a brake pedal of said vehicle, said power and reaction pistons being spaced one from another when said booster is in its free position and adapted to establish a mechanical power-transmitting connection after a relative travel between the pistons, said valve body defining an inlet port communicating with a variable volume which is also defined by said valve body and in between said power and reaction pistons, a restriction point formed in said valve body around said second bore and an edge of said reaction piston adapted to restrict flow through itself in response to a relative travel of the reaction piston and the valve body, and a flow passage through said brake booster motor initiating at said inlet port, continuing through said variable volume and through said restriction point.

8. A brake booster motor as in claim 7 including spring means disposed in a power-transmitting linkage connecting said reaction piston to said brake pedal, making said linkage resilient while said spring means is active, and abutting stop means making said spring means inactive when a certain level of force transmitted through said linkage is surpassed.

9. A brake booster motor as in claim 7 including a spring means urging said reaction piston in a direction toward said power piston to maintain a substantially constant pressure in said variable volume when said brake booster motor is in its free position.

10. A brake booster motor as in claim 7, including a secondary variable volume defined by said valve body and in between said power piston and a cover at the end of said first bore, said secondary variable volume being in communication with said flow passage downstream of the restriction point.

11. A brake booster motor as in claim 7, including a dampening means to dampen the movement of said reaction piston relative to said valve body.

12. A brake booster motor as in claim 11, wherein said dampening means comprises an annular damper chamber defined in between said valve body and said reaction piston and orifice means communicating said damper chamber to said flow passage.

* * * * *

UNITED STATES PATENT OFFICE
CERTIFICATE OF CORRECTION

Patent No. 3,751,919      Dated August 14, 1973

Inventor(s) Benjamin Ron

It is certified that error appears in the above-identified patent and that said Letters Patent are hereby corrected as shown below:

Figure 1 should be deleted and substituted with the attached Figure 1 therefor.

Signed and Sealed this

First Day of March 1977

[SEAL]

Attest:

RUTH C. MASON
*Attesting Officer*

C. MARSHALL DANN
*Commissioner of Patents and Trademarks*

FIG.1